United States Patent [19]
McAllister et al.

[11] Patent Number: 5,553,119
[45] Date of Patent: Sep. 3, 1996

[54] INTELLIGENT RECOGNITION OF SPEECH SIGNALS USING CALLER DEMOGRAPHICS

[75] Inventors: Alex McAllister, Silver Spring; Laird Wise, Ellicott City, both of Md.

[73] Assignee: Bell Atlantic Network Services, Inc., Arlington, Va.

[21] Appl. No.: 271,885

[22] Filed: Jul. 7, 1994

[51] Int. Cl.⁶ .................... H04M 3/64; G10L 9/06
[52] U.S. Cl. .................... 379/67; 379/88; 379/207; 379/265; 395/2.4; 395/2.79
[58] Field of Search ................. 379/67, 88, 89, 379/265, 266, 207; 395/2.4, 2.79

[56] References Cited

U.S. PATENT DOCUMENTS

| | | | |
|---|---|---|---|
| 4,546,383 | 10/1985 | Abramatic et al. | 379/52 X |
| 4,594,476 | 6/1986 | Freeman | 379/77 X |
| 4,769,845 | 9/1988 | Nakamura | 395/2.4 |
| 4,922,538 | 5/1990 | Tchorzewski | 395/2.4 X |
| 4,979,206 | 12/1990 | Padden et al. | 379/67 |
| 5,033,088 | 7/1991 | Shipman | 379/88 X |
| 5,163,083 | 11/1992 | Dowden et al. | 379/88 |
| 5,181,237 | 1/1993 | Dowden et al. | 379/88 |
| 5,185,781 | 2/1993 | Dowden et al. | 379/67 |
| 5,267,304 | 11/1993 | Slusky | 379/201 |
| 5,297,183 | 3/1994 | Bareis et al. | 379/88 X |
| 5,297,194 | 3/1994 | Hunt et al. | 379/88 |
| 5,311,572 | 5/1994 | Friedes et al. | 379/242 X |
| 5,333,185 | 7/1994 | Burke et al. | 379/246 X |
| 5,335,266 | 8/1994 | Richardson et al. | 379/202 X |
| 5,335,269 | 8/1994 | Steinlicht | 379/309 X |
| 5,479,488 | 12/1995 | Lennig et al. | 379/67 |

FOREIGN PATENT DOCUMENTS

| | | | |
|---|---|---|---|
| 1162336 | 2/1984 | Canada | 379/88 |

OTHER PUBLICATIONS

Chigler, "Rejection and Keyboard Spotting Algorithms for a Directory Assistance Name Recognition Application," 1992 IEEE II–93–II–96.

*Primary Examiner*—Jeffery Hofsass
*Assistant Examiner*—Daniel S. Hunter
*Attorney, Agent, or Firm*—Lowe, Price, LeBlanc & Becker

[57] ABSTRACT

In a switching system for connecting a call between a calling station and a called station, a system and method of voice recognition using a concentrated or distributed multiplicity of voice recognition and other resources with a facility for selecting an initial resource on the calling station going off-hook by accessing a demographic database using common channel signaling and selecting a prompt to be delivered to the caller from a multiplicity of preselected prompts and reacting to a response by the caller with further addressing of database information to continue to select from said multiplicity of resources the most appropriate resource or resources in reaction to caller utterances. According to another feature the selection of resources is aided by optical means at the calling station delivering information regarding characteristics of the caller including lip movement to permit lip reading.

21 Claims, 6 Drawing Sheets

INTELLIGENT RECOGNITION OF SPEECH SIGNALS USING CALLER DEMOGRAPHICS

TECHNICAL FIELD

This invention relates to methods and apparatus for automating various user initiated telephony processes, particularly through the use of improved recognition systems and methodology.

BACKGROUND ART

In the environment of telecommunications systems there has been a steady trend toward automating what was originally operator assistance traffic. Much current activity is directed to responding to directory assistance calls by processing voice frequency instructions from the caller without operator intervention. The instructions are used by an automatic speech recognition unit to generate data signals corresponding to recognized voice frequency signals. The data signals are then used to search a database for a directory listing to derive the desired directory number. A system of this type is described in U.S. Pat. No. 4,979,206 issued Dec. 18, 1990.

According to that patent such automated service is supplied by a switching system equipped with an automatic speech recognition facility for interpreting a spoken or keyed customer request comprising data for identifying a directory listing. In response to recognition of data conveyed by the request, the system searches a database to locate the directory number listing corresponding to the request. This listing is then automatically announced to the requesting customer. In implementing this system the calling customer or caller receives a prompting announcement requesting that the caller provide the zip code or spell the name of the community of the desired directory number. The caller is also prompted to spell the last name of the customer corresponding to the desired directory number. If further data is required, the caller may be prompted to spell the first name and street address of the desired party. Following responses to prompting announcements a search is made to determine if only one listing corresponds to the data supplied by the caller. When this occurs the directory number is announced to the caller. The aim of such a system has been to require a minimum of speech recognition capability by the speech recognition facility—namely, only letters of the alphabet and numbers.

A typical public switched telephone network (PSTN) arrangement proposed to effect such a system is illustrated in block diagram form in FIG. 1 of the aforementioned patent (PRIOR ART). The network of FIG. 1 is here described in some detail as a typical environment in which the method and apparatus of the invention may be utilized. In FIG. 1 block 1 represents a telecommunications switching system, or switch operating under stored program control. Switch 1 may be a switch such as the 5ESS switch manufactured by AT&T Technologies, Inc., arranged to offer the Operator Services Position System (OSPS) features.

Shown within switch 1 are various blocks for carrying out the functions of a program controlled switch. Control 10 is a distributed control system operating under the control of a group of data and call processing programs to control various sections or elements of switch 1. Element 12 is a voice and data switching network capable of switching voice and/or data between inputs connected to that switching network, frequently referred to as the switch fabric or network. Connected to network 12 is a Voice Processing Unit (VPU) 14. Network 12 and VPU 14 operate under the control of control 10. Trunks 31 and 33, customer line 44, data link 35, and operator access facility 26 are connected to network 12 at input ports 31a, 33a, 44a, 35a, and 26a respectively, and control 10 is connected to network 12 via data channel 11 at input port 11a.

VPU 14 receives speech or customer keyed information from callers at calling terminals 40 or 42 and processes the voice signals or keyed tone signals from a customer station using well known automatic speech recognition techniques to generate data corresponding to the speech or keyed information. These data are used by Directory Assistance Computers (DAS/C) 56 in making a search for a desired telephone or directory number listing. When a directory assistance request comes from a customer terminal 42 via customer line 44, port 44a and switching network 12 to VPU 14, VPU 14 analyzes voice input signals to recognize individual ones of various elements corresponding to a predetermined list of spoken responses.

VPU 14 also generates voice messages or announcements to prompt a caller to speak information into the system for subsequent recognition by the voice processing unit. VPU 14 generates output data signals, representing the results of the voice processing. These output signals are sent to control 10 whence they may be transmitted via data link 59 to DAS/C computer 56, or be used within control 10 as an input to the program of control 10 for controlling establishment of connections in switching network 12 or requesting further announcements by VPU 14. VPU 14 includes announcement circuits 13 and detection circuits, i.e., automatic speech recognition circuits 15 both controlled by a controller of VPU 14. A Conversant 1 Voice System, Model 80, manufactured by AT&T Technologies, Inc., may be used to carry out the functions of the VPU 14.

When the DAS/C computer 56 completes its data search and locates the requested directory listing, it is connected via data link 58 to an Audio Response Unit (ARU) 60, which is connected to the voice and data switching network 12 for announcing the telephone number of an identified telephone listing. Computer Consoles, Inc. (CCI) manufactures an Audio Response Unit 16 and the DAS/C terminal 52 which may be used in this environment. As shown, the DAS/C computer 56 is directly connected to control 10 by data link 59 but could be connected to control 10 via a link to network 12 and a connection through network 12 via port 11a. After a directory listing is found the directory number is reported to audio response unit 60 for announcement to the caller.

Directory assistance calls can also be processed with the help of an operator if the VPU fails to recognize adequate oral information.

Connected to switch 1 are trunks 31 and 33 connected to local switch 30 and interconnection network 32. Local switch 30 is connected to calling customer terminal 40 and interconnection network 32 is connected to a called customer terminal 46. Switch 30 and network 32 connect customer terminal signals from customer terminals to switch 1. Also connected to switch 1 are customer lines including customer line 44 for connecting a customer terminal 42 to switch 1.

In an alternate connection calling terminal 40 is connected via local switch 30 to switch 1. In a more general case, other switches forming part of a larger public telephone network such as interconnection network 32 would be required to connect calling terminal 40 to switch 1. Generally speaking, calls are connected to switch 1 via communication links such as trunks 31 and 33 and customer line 44. In the alternate connection calling terminal 40 is connected by a customer line to a 1AESS 30, manufactured by AT&T Technologies, Inc., and used here as a local switch or end office. That switch is connected to trunk 31 which is connected to switch 1. Local switch 30 is also connected to switch 1 by a data link 35 used for conveying common channel signaling messages between these two switches. Such common channel signaling messages are used herein to request switch 30 to initiate the setting up of a connection, for example, between customer terminals 40 and 46. Switch 1 is connected in the example terminating connection to called terminal 46 via interconnection network 32. If the calling terminal is not directly connected to switch 1, the directory number of the calling terminal identified, for example, by Automatic Number Identification (ANI), is transmitted from the switch connected to the calling terminal to switch one.

Operator position terminal 24 connected to switch 1 comprises a terminal for use by an operator in order to provide operator assistance. Data displays for the operator position terminal 24 are generated by control 10. Operator position terminal 24 is connected to switching network 12 by operator access facility 26 which may include carrier facilities to allow the operator position to be located far from switching network 12 or may be a simple voice and data access facility if the operator positions are located close to the switching network.

In order to handle directory assistance services, the directory assistance operator has access to two separate operator terminals; terminal 24 for communicating with the caller and switch 1 and terminal 52 used for communicating via data link 54 with DAS/C computer 56. The operator at terminals 24 and 52 communicates orally with a caller and on the basis of these communications keys information into the DAS/C terminal 52 for transmission to the DAS/C computer 56. The DAS/C computer 56 responds to such keyed information by generating displays of information on DAS/C terminal 52 which information may include the desired directory number. Until the caller provides sufficient information to locate a valid listing the caller is not connected to an audio response unit since there is nothing to announce. Further details of the operation of the system of FIG. 1 are set forth in U.S. Pat. No. 4,979,206.

Further examples of use of voice recognition in automation of telephone operator assistance calls is found in U.S. Pat. Nos. 5,163,083, issued Nov. 10, 1992; 5,185,781, issued Feb. 9, 1993; 5,181,237, issued Jan. 19, 1993, to Dowden et al.

Another proposed use for speech recognition in a telecommunications network is voice verification. This is the process of verifying the person's claimed identity by analyzing a sample of that person's voice. This form of security is based on the premise that each person can be uniquely identified by his or her voice. The degree of security afforded by a verification technique depends on how well the verification algorithm discriminates the voice of an authorized user from all unauthorized users. It would be desirable to use voice verification to verify the identity of a telephone caller. Such schemes to date, however, have not been implemented in a fully satisfactory manner. One such proposal for implementing voice verification is described in U.S. Pat. No. 5,297,194, issued Mar. 22, 1994, to Hunt et al. In an embodiment of such a system described in this patent a caller attempting to obtain access to services via a telephone network is prompted to enter a spoken password having a plurality of digits. Preferably, the caller is prompted to speak the password beginning with the first digit and ending with a last digit. Each spoken digit of the password is then recognized using a speaker-independent voice recognition algorithm. Following entry of the last digit of the password, a determination is made whether the password is valid. If so, the caller's identity is verified using a voice verification algorithm.

This method is implemented according to that patent using a system comprising a digital processor for prompting the caller to speak the password and then using speech processing means controlled by the digital processor for effecting a multi-stage data reduction process and generating resulting voice recognition and voice verification parameter data and voice recognition and verification routines.

Following the digit based voice recognition step, the voice verification routing is controlled by the digital processor and is responsive to a determination that the password is valid for determining whether the caller is an authorized user. This routing includes transformation means that receives the speech feature data generated for each digit in the voice verification feature transformation data and in response thereto generates voice verification parameter data for each digit. A verifier routing receives the voice verification parameter data and the speaker-relative voice verification class reference data and in response thereto generates an output indicating whether the caller is an authorized user.

In operation a caller places a call from a conventional calling station telephone to a financial institution or card verification company in order to access account information. The caller has previously enrolled in the voice verification database that includes his or her voice verification class reference data. The financial institution includes suitable input/output devices connected to the system (or integrally therewith) to interface signals to and from the telephone lines. Once the call set up has been established, the digital processor controls the prompt means to prompt the caller to begin digit-by-digit entry of the caller's preassigned password. The voice recognition algorithm processes each digit and uses a statistical recognition strategy to determine which digit (0–9 and "oh") is spoken. After all digits have been recognized, a test is made to determine whether the entered password is valid for the system. If so, the caller is conditionally accepted. In other words, if the password is valid the system "knows" who the caller claims to be and where the account information is stored.

Thereafter the system performs voice verification on the caller to determine if the entered password has been spoken by a voice previously enrolled in the voice verification reference database and assigned to the entered password. If the verification algorithm establishes a "match" access to the data is provided. If the algorithm substantially matches the voice to the stored version thereof but not within a predetermined acceptance criterion, the system prompts the caller to input additional personal information to further test the identity of the claimed owner of the password. If the caller cannot provide such information, the system rejects the access inquiry and the call is terminated.

Existing approaches for deploying speech recognition technology for universal application are based on creating speech models based on "average" voice features. This averaging approach tends to exclude persons with voice characteristics beyond the boundaries created by the averaging. The speech model averages are based on the training set used when the models are created. For example, if the models are created using speech samples for New Englanders then the models will tend to exclude voices with Southern accents or voices with Hispanic accents. If the models try to average an all inclusive population, the performance deteriorates for the entire spectrum.

BRIEF SUMMARY OF THE INVENTION

It is an object of the invention to provide a system and method for accomplishing universal speech recognition on a reliable basis using a unique combination of existing technologies and available equipment.

The new and improved methodology and system involves an initial two step passive and active procedure to preselect the most appropriate technology model or device for each type of caller. The passive feature may be based on numerous factors subject to determination without seeking active participation by the customer or user. One such factor is demographics which may be determined by identifying the geographic area of origin of the call. This may be accomplished through the use of ANI or Caller ID or any one of a number of other passively determinable factors such as ICLID, DNIC, NNX, area code, time of day, snapshot, date or biometrics. If the profile database constructed for the purpose of making an appropriate choice of recognition technology model or device on the basis of passive features is inconclusive, a second step or active procedure may be initiated. This may take the form of an automated oral query or prompt to solicit a customer or caller response that can be analyzed to select the appropriate recognition model or device following the caller active step.

It has been recognized by the inventor that a factor in obtaining high efficiency speech recognition is that the speech recognition products of different vendors perform more or less satisfactorily under differing specific circumstances. For example, the equipment of one vendor may provide the best performance for continuous digit recognition, the equipment of another vendor may provide the best performance for speaker dependent recognition, the equipment of still another vendor may provide the best performance for speaker independent/word spotting recognition, the equipment of another vendor or different equipment of the same vendor may provide the best performance for male voices or female voices, etc.

According to the invention this seeming limitation is utilized to advantage by providing a platform (which may be distributed) which includes the speech recognition equipment of multiple vendors. The recognition task is then handled by directing a specific recognition question to the type of equipment best able to handle that specific situation. Thus an optimal arrangement might incorporate the algorithms of multiple vendors within a single bus architecture so that multiple vendor boards are placed on the main machine and the operating program directs the signal to be recognized to the most appropriate board for processing.

In many cities it is known that certain areas are largely, if not completely, populated by particular ethnic groups. As a part of the passive step, the incoming call can be identified as to the area of call origin and that call directed at the outset to a voice recognition sub-system which is most effective for the language or accent of that ethnic group. This may be accomplished by creating a demographic database based on statistical data collected for the involved city. Thus each city may have its own unique demographic database.

According to a preferred embodiment the recognition device may then comprise a platform which includes multiple different recognition resources. Specific resources are then selected for their pre-established ability to handle different situations with high efficiency. With such resources available across a backbone, such as an Ethernet, an executive server can direct a speech input to a selected resource depending upon the ethnic vocabulary needed at that time. The demographic database may be advantageously associated with and controlled by the intelligence available in the AIN ISCP. The incoming call can trigger the ISCP via the AIN network on the basis of the ANI or Caller ID information to direct call setup to the selected resource prior to connection of the caller. This passive procedure is completely transparent to the caller.

Once the call is connected into a particular resource, a speech sample is obtained which can be used to confirm that the call is in the correct resource utilizing the appropriate models. If there is any question as to the correctness of this solution, a direct question can be triggered to obtain active caller participation. Thus the caller can be asked a question which would require an answer tailored to permit more specific language identification. In appropriate circumstances the caller may be instructed to converse in what is tentatively established to be his/her native language.

In addition to the foregoing it is a feature of the invention that the intelligent recognition process can also detect behavioral information such as anxiety, anger, inebriation, etc. This aspect of the invention requires additional database data which may be provided for that purpose. As a last resort, a caller can be connected to a live operator.

The foregoing discussion is directed to the situation in which a particular call is directed to a single voice recognition resource selected either on the passive and/or active basis described above. However in times of low network traffic it is also a feature of the invention to process an incoming call through multiple resources in parallel to provide a maximum reliability in recognition. For example, the involved telephone station, particularly a public station, may include a more or less sophisticated camera or optical/electronic device effective to accomplish lip reading, or classify gender, or other physical characteristics of the caller.

After speech recognition has been achieved according to the invention, the resulting output signals may be utilized for any of a number of purposes, such as in the directory assistance procedure illustrated and described in relation to FIG. 1, or as a substitute for dialing where the desired directory number is merely spoken by the caller. Still further, the high reliability of the system makes possible enhanced services which would permit a user to speak a predetermined identification word and then say "home" or "office" to achieve automatic completion of a call to his/her home or office.

Accordingly it is a primary object of the invention to provide an improved system and method for accomplishing universal speech recognition in the environment of a switched telephone network and most particularly a PSTN.

It is another object of the invention to provide a system and method for accomplishing universal speech recognition for purposes of the transfer of spoken intelligence as well as speaker authentication.

It is yet another object of the invention to provide an improved system and method for accomplishing universal speech recognition on an efficient and economic basis using features and technologies currently available to the public switched telephone network.

It is another object of the invention to provide such a system using a two step passive and active procedure wherein the passive step is completely transparent to the user and the active step may be transparent to the user with respect to the purpose of the activity.

It is another object of the invention to provide an improved system and method for accomplishing universal speech recognition on a reliable basis using the two step procedure wherein the passive step is at least partially based on demographic data which is unique to the site and which is sensed using existing PSTN technologies.

It is a further object of the invention to provide an improved system and method for accomplishing universal speech recognition on a reliable basis using a combination of passive and active determinations which include detection of behavioral information such as anxiety, anger, inebriation and the like.

These and further objects and advantages of the invention will become apparent from the following classification, claims and drawings.

BEST MODE FOR CARRYING OUT THE INVENTION

Figure 2:
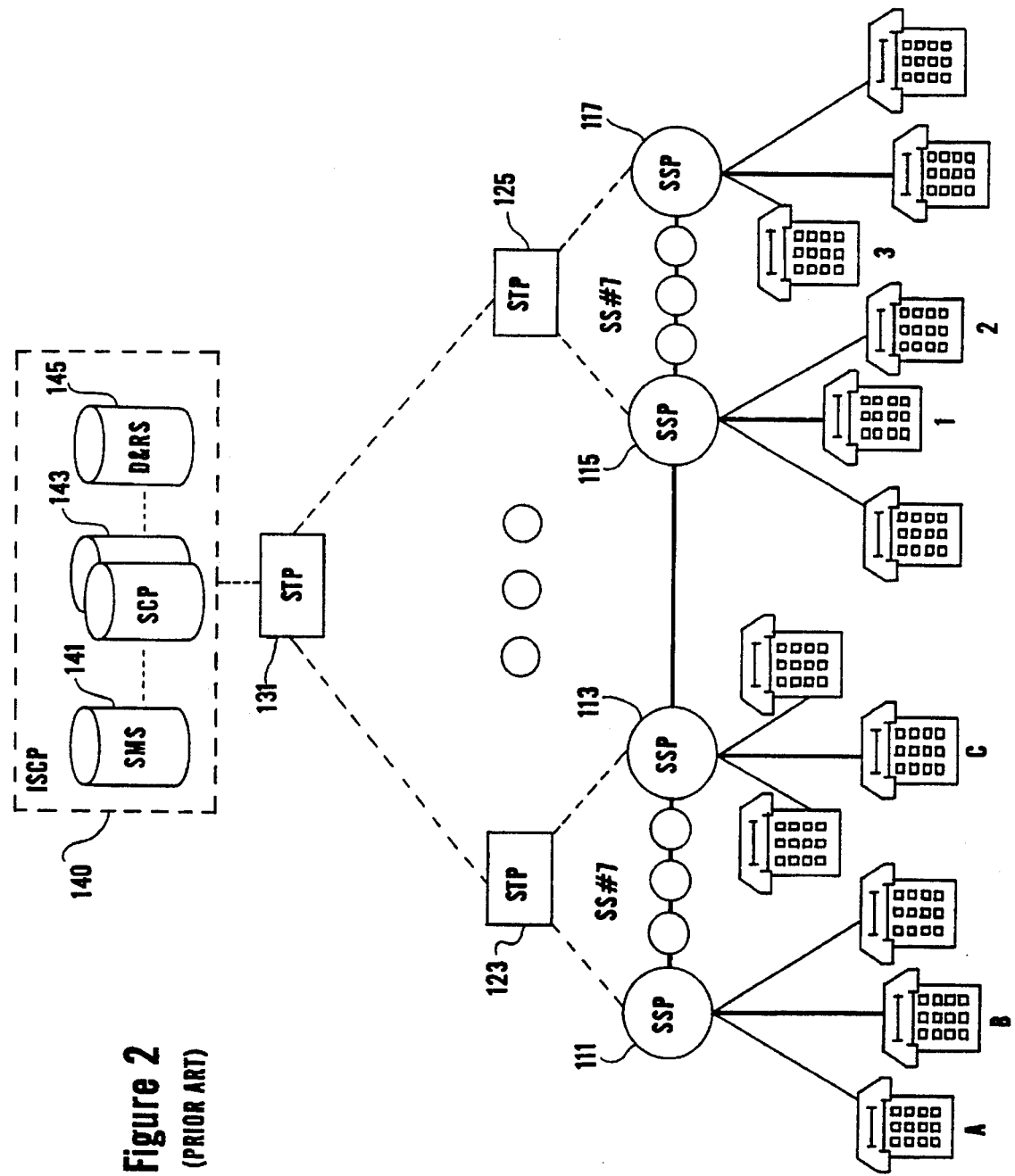
FIG. 2 is a block diagram of a typical Advanced Intelligent Network (AIN) system used in the preferred embodiment for implementing the invention.

Referring to FIG. 2 there is shown a typical AIN equipped switched telephone network which provides the preferred implementation for the invention. In the system shown in FIG. 2, each of the central office switching systems are labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls.

Figure 1:
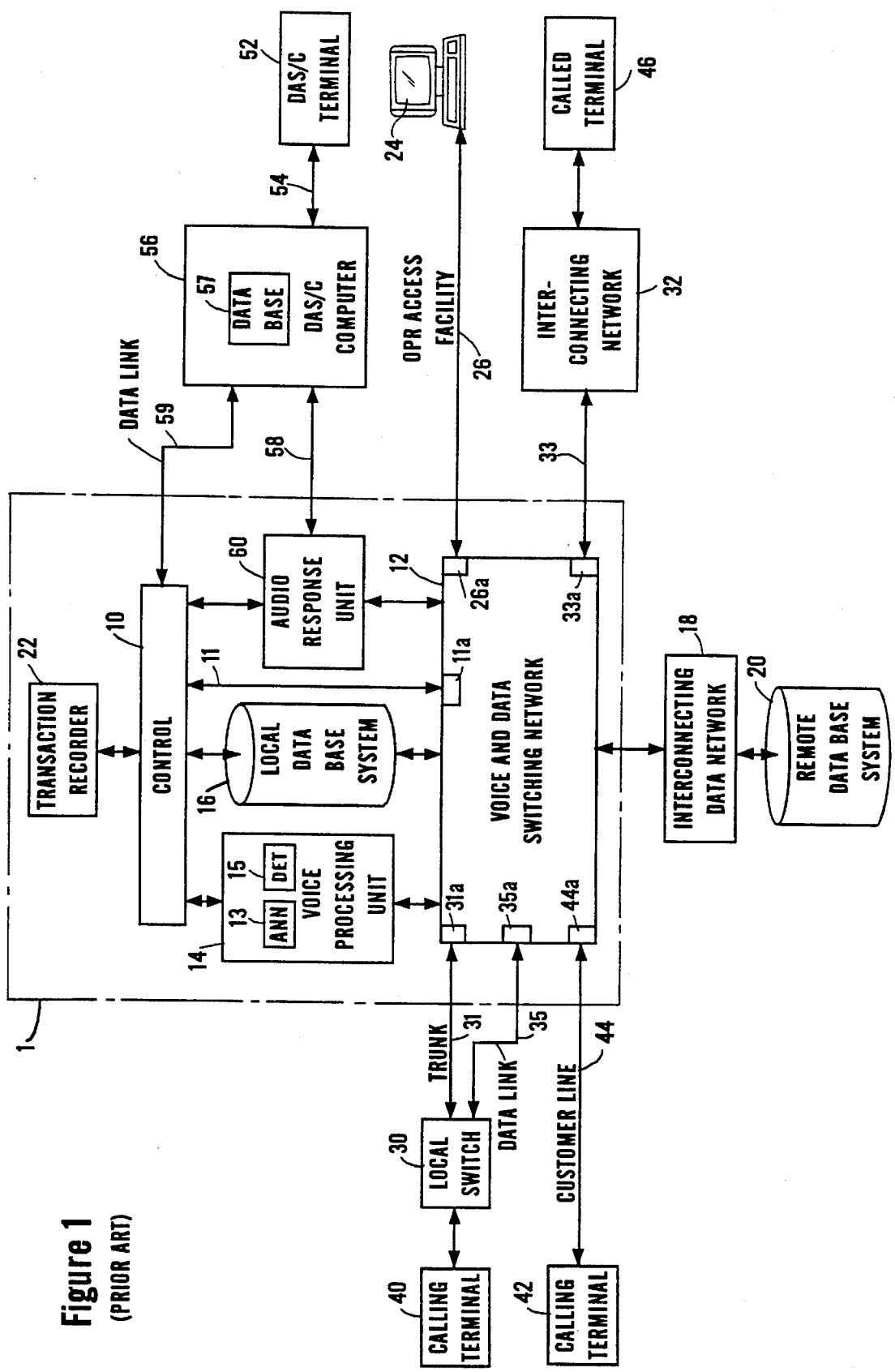
FIG. 1 is a block diagram of a prior art telecommunications switching system and auxiliary facilities adapted to offer automated directory assistance service, including a control unit and a voice processing unit (comprising a speech recognition facility)

As shown in FIG. 1, all of the central office switches 111, 113, 115 and 117 are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Siemens, manufacture comparable digital switches which could serve as the SSP's. A 5ESS type switch version has been illustrated and described in connection with FIG. 1 above. While the network illustrated in FIG. 2 shows all central offices functioning as SSP's other AIN implementations provide the SSP functionality only at selected points in the network, and end offices without such functionality forward calls to one of the SSP's.

The SSP's 111 and 113 connect to a first local area STP 123, and the SSP's 115 and 117 connect to a second local area STP 125. The connections to the STP's are for signaling purposes. As indicated by the black dots below STP's 123 and 125, each local area STP can connect to a large number of the SSP's. The central offices or SSP's are interconnected to each other by trunk circuits (illustrated in FIG. 2 as bold lines) for carrying telephone services.

The local area STP's 123 and 125, and any number of other such local area STP's shown as circles between STP's 123 and 125, communicate with a state or regional STP 131. The state or regional STP 131 in turn provides communications with the ISCP 140. The STP hierarchy can be expanded or contracted to as many levels as needed to serve any size area covered by the Advanced Intelligent Network (AIN) and to service any number of stations and central office switches. The links between the central office switching systems and the local area STP's 123 and 125 are typically SS7 type CCIS interoffice data communication channels. The local area STP's are in turn connected to each other and to the regional STP 131 via a packet switched network. The regional STP 131 also communicates with the ISCP 140 via a packet switched network.

The above described data signaling network between the SSP type central offices and the ISCP is preferred, but other signaling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

As shown in FIG. 2, the ISCP 140 is an integrated system. Among other system components, the ISCP 140 includes a Service Management System (SMS) 141, a Data and Reporting System (D&RS) 145 and the actual database referred to as a Service Control Point (SCP) 143. The ISCP also typically includes a terminal subsystem referred to as a Service Creation Environment or SCE (not shown) for programming the data base in the SCP 143 for the services subscribed to by each individual business customer.

Although shown as telephones in FIG. 2, the terminals can comprise any communication device compatible with the line. Where the line is a standard voice grade telephone line, for example, the terminals could include facsimile devices, modems, credit card validation terminals, etc.

Each central office switching system or SSP normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP 111 provides the call connection without any connection to another central office. When the called line connects to a distant station, for example when station A calls station C, the connection is made through the connected central office switching system SSP 111 and at least one other central office switching system SSP 113 through the telephone trunks interconnecting the two central office switches.

In CCIS type call processing the local central office suspends the call and sends a query message through one or more of the STP's. The query message goes to the central office to which the called station is connected, referred to as the "terminating" central office; for example, for a call from station A to station C the query would go from originating SSP 111 to terminating SSP 113. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

In an Advanced Intelligent Network (AIN) type system, such as shown in FIG. 2, certain calls receive specialized AIN type processing under control of data files stored in the SCP database 143 within the ISCP 140. In such a network, the SSP type local offices of the public telephone network detect a call processing event identified as an AIN "trigger." For ordinary telephone service calls, there would be no event to trigger AIN processing; and the local and toll office switches would function normally and process such calls as discussed above, without referring to the SCP database for instructions. An SSP office which detects a trigger, however, will suspend call processing, compile a TCAP formatted call data message and forward that message via a common channel interoffice signaling (CCIS) link and STP(s) to the ISCP 140 which includes the SCP database 143. If needed, the ISCP can instruct the central office to obtain and forward additional information. Once sufficient information about the call has reached the ISCP, the ISCP accesses its stored data tables to translate the received message data into a call control message and returns the call control message to the office of the network via CCIS link and STP(s). The SSP then uses the call control message to complete the particular call through the network. The present invention allows a subscriber to interact with the SCP database maintained in the ISCP, to control the implementation of the intelligent recognition of the invention.

Figure 3:
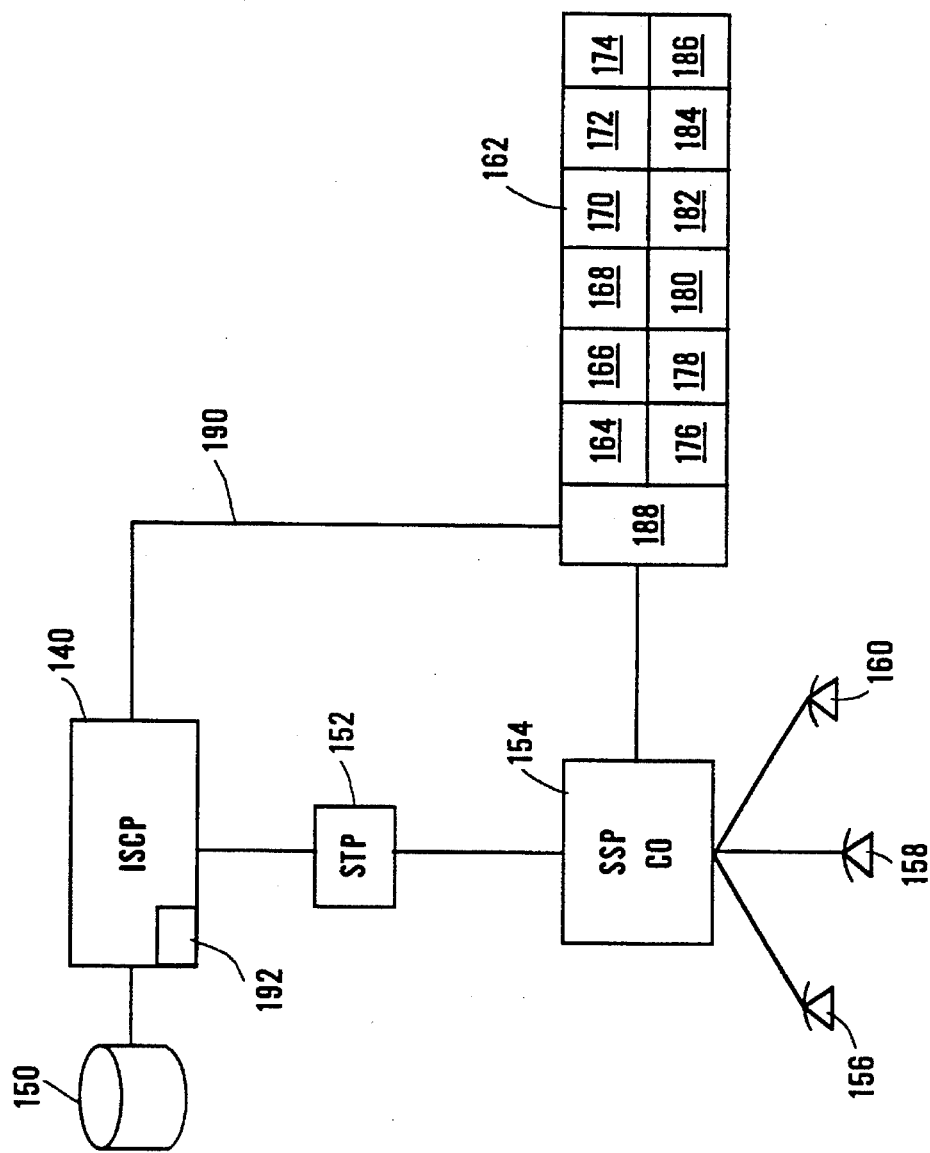
FIG. 3 is a schematic block diagram illustrating a platform for implementing the invention according to one embodiment.

At the present time the telecommunications industry is engaged in an on-going effort to utilize voice recognition to aid and expedite the handling of various services. An illustrative example has been shown and described in connection with FIG. 1. According to the present invention an improved voice recognition implementation incorporates a profiling procedure which is effectuated in both a passive and active manner. The aim is to customize the recognition mechanisms to the maximum feasible extent in the interest of increasing accuracy in dealing with a demographically diverse population. The intelligence and triggering ability of the AIN ISCP offers an advantageous and economic system and methodology for effectuating this purpose. The ISCP may be equipped with various types of demographic and related databases which can be utilized to aid in categorization or profiling of the caller. Referring to FIG. 3, the ISCP 140 may be provided with an additional database 150 in which is compiled information regarding the geographic distribution of ethnic groups in a specific city. By ISCP identification of the calling station which is contained in the TCAP signal, a specific ethnic group may be identifiable.

Referring to FIG. 3 the ISCP 140 is connected in the general architecture illustrated in FIG. 2 to one or more STP's 152 and to an SSP and central office 154. The central office 154 may be connected to telephone stations 156–160 and to other central offices and/or SSP's as generally illustrated in FIG. 2. The switching office 154 may be considered to be generally similar to that illustrated at 1 in FIG. 1. According to the invention there is connected to a voice and data switching network and to the control in the switching office 154 a multiboard voice recognition platform 162. The voice recognition platform 162 preferably provides an open bus architecture, such as the standard EIA bus, to which are connected multiple resources indicated at 164–186, fed by a front end 188. The resources associated with the platform 162 may be concentrated as shown in FIG. 3 or may be distributed and connected by a suitable LAN.

Resources 164–186 preferably constitute voice recognition devices or "boards" having different capabilities or efficiencies in handling specific recognition situations. That is, the resources may provide varying degrees of reliability under differing circumstances. For example, one board or device may provide the most reliable recognition of numbers or digits, another may provide high reliability for recognizing letters of the alphabet, another may provide high reliability in a specific limited vocabulary, still another may provide high reliability with respect to specific ethnically accented English, another may provide high reliability for a specific gender, etc. Still other resources may be devoted to different languages, it being a feature of the invention that automation may indicate the preferability of requesting the caller to use his/her native language. Other resources may be devoted to authentication and verification. Thus resources can be provided for speaker dependent recognition on a general vocabulary basis or speaker dependent recognition of words, passwords or numbers. An open bus architecture platform of this general nature is presently provided by VoicePlex Corporation of Irving, Tex. The product is called VoicePac. The platform 162 is connected to the ISCP 140 through data link 190 to provide ISCP control thereof.

The ISCP may be used to perform virtually all of the control functions of the front end 188 or, in the alternative, the ISCP participation can be minimized by utilizing an intelligent peripheral as the front end. With control provided by either the ISCP and/or the front end or intelligent peripheral, the resource platform provides interaction which need not limited to the initial selection of a resource but which may also continually select between the different resources dependent upon control signals dictated by the point in the transaction (PICT). Thus different resources may be called into use dependent upon the expected use of digits, alphabet, speaker recognition, password recognition, etc. Illustrative suppliers of voice recognition resources including Texas Instruments, Northern Telecom, Dialogic, and Voice processing Corporation (VPC), and others. A selection may be driven not only by the nature of the recognition problem but also by behavioral aspects of a given transaction. Thus the state of anxiety of a speaker may be judged by the pitch of the voice with an increase in anxiety rate being indicated by an increase in voice pitch. The ISCP or intelligent peripheral on detecting such a change may dictate selection of a different appropriate resource.

The selection process reaction to the control signals from the ISCP or intelligent peripheral in addition to selecting the appropriate resource also selects the schedule of prompts (instructions or inquiries).

If the database constructed for the purpose of making the appropriate resource choice on the basis of passive features is inconclusive, a second or active step procedure may be initiated. In an illustrative example this occurs where the passive procedures carried out under the control of the ISCP or intelligent peripheral indicate that the result is insufficiently certain. In that event the ISCP or intelligent peripheral sends a signal to initiate a prompt in the form of a query to solicit user response that can be analyzed to aid in the resource selection process. The inquiry may solicit a response which will provide a sample of speech aimed particularly at categorizing the user. The particular word or words of speech would be selected for that purpose and may not be truly germane to the call but used strictly for recognition purposes. For example, the passive analysis may provide an inconclusive indication of the native language of the speaker. This result may be used to trigger an inquiry to the caller requesting a "yes" or "no" confirmation of that tentative conclusion. The inquiry itself may be couched in the tentatively selected language if the degree of certainty reaches a predetermined point. If the caller confirms the identity of the language the controller (ISCP or intelligent peripheral) can then dictate the selection of the appropriate resource for that language as well as the schedule of prompts. Thus a two-fold selection is made.

In addition to the foregoing, the telephone station may be provided with available optical or camera fittings to permit lip reading to produce a second signal with added intelligence to supplement that obtained from the audio response.

Figure 7:
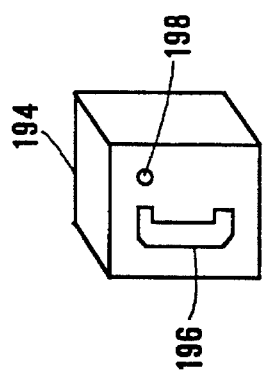
FIG. 7 is a diagrammatic illustration of a public telephone station equipped with a camera lens which acts as a sensor to provide additional passively obtained information.

Digital cameras are available for this purpose and can provide a digital signal subject to decoding in a decoder located at any suitable site such as with the resource platform or the ISCP. The speech recognition process may then be based on the parallel outputs of resources reading the audio and video signals. Such a decoder is indicated diagrammatically at 192 in the ISCP 140. A telephone station having such a camera is shown in FIG. 7 wherein the station is indicted at 194, the handset at 196, and the camera at 198.

Figure 4:
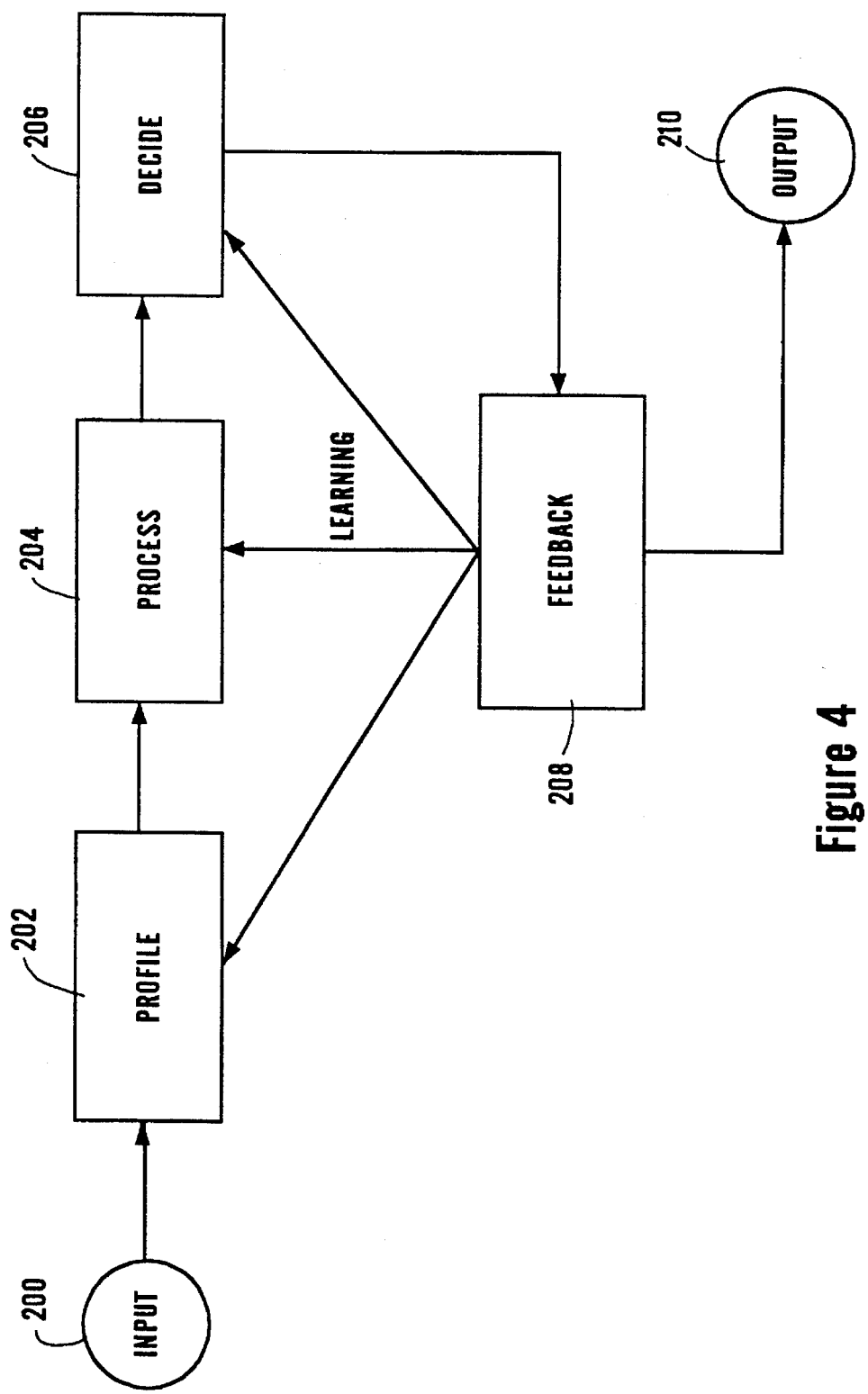
FIG. 4 is a high level process flow diagram for the intelligent recognition system of the invention.

Referring to FIG. 4 there is shown a high level process flow for the intelligent recognition system of the invention. The caller input is indicated at 200. Initially the simple lifting of the handset creates an off-hook condition. The profile step is shown at 202 and the recognition process at 204. The decision (tentative or final) occurs at 206 which may result in feedback 208 in a tentative situation, and ultimately to the output data signal resulting from translation of the voice at 210.

Figure 5:
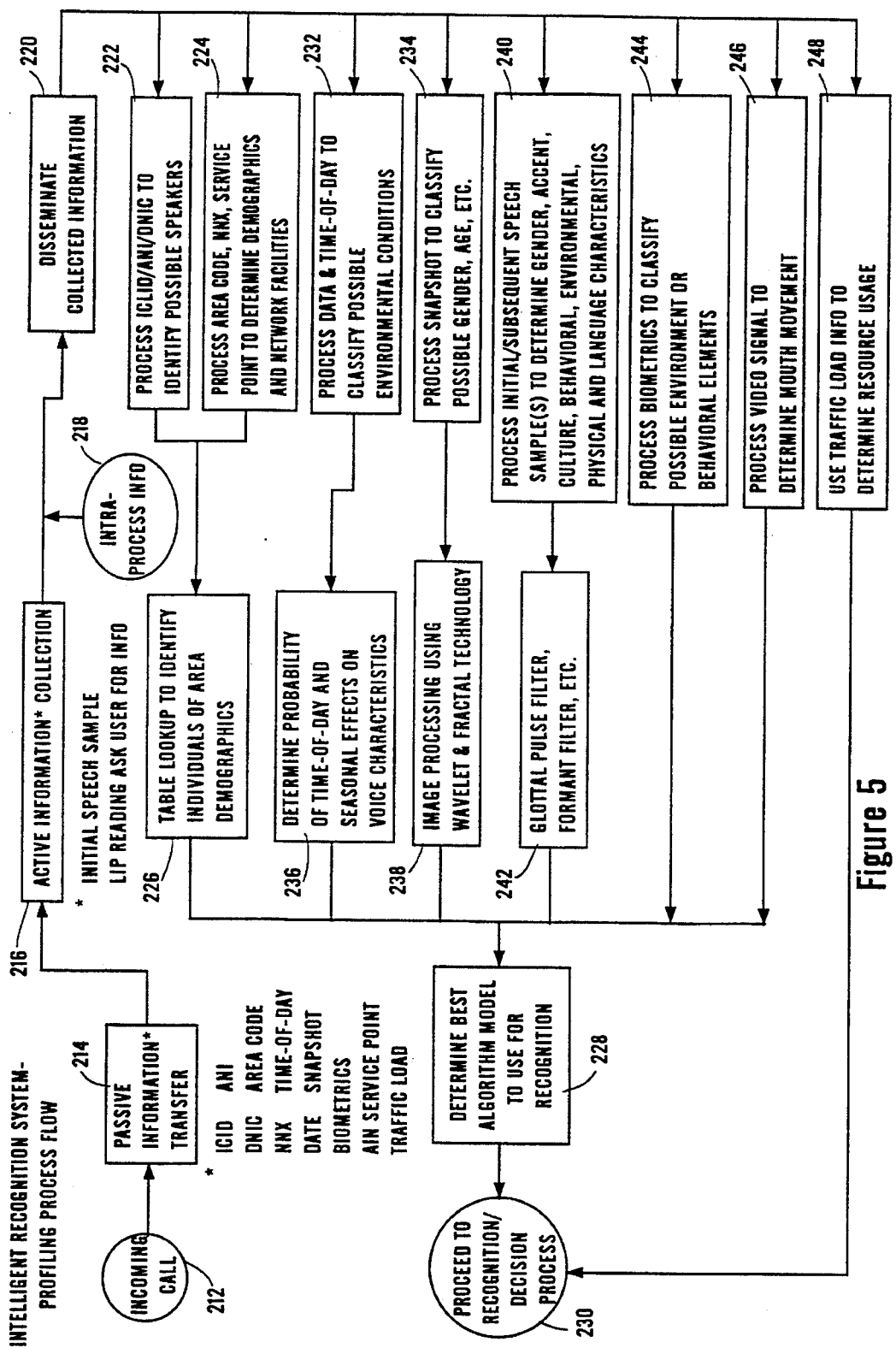
FIG. 5 is a process flow diagram illustrating the profiling procedure.

FIG. 5 illustrates the profiling process flow. Thus the incoming call is shown at 212, passive information transfer at 214, active information collection at 216, intra-process information at 218, and dissemination of collected information at 220. Collected information such as the identity of the calling station obtained via ICLID, ANI or DNIC is processed at 222. Similarly, identification may be via the area code, NNX, or service point indicated as being processed at 224. These profiling inputs 222 and 224 are fed to the lookup table or database as indicated at 226 to determine the best algorithm model or resource to use for recognition as shown at 228. This results in the algorithm being utilized to conclude the recognition process and generation of the output signal at 230.

Other factors which may be utilized in a profiling procedure are the date and time of day to classify possible environmental conditions indicated at 232, and the output of the camera indicated at 234. These are processed at 236 and 238 respectively to provide further input into the determination of the best algorithm model at 228. Such processing may be serial or parallel as previously described. Other factors which may aid in selecting the optimal resource include the determination of gender, accent, culture, behavioral, environmental, physical and language characteristics indicated at 240 and processed at 242. Still further variables capable of being sensed and utilized in the procedure are biometrics indicated at 244 and processing of the video signals as in lip reading indicated at 246. The sensing of traffic load information to determine the degree of resource usage is indicated at 248 and provides assistance in determining whether low traffic load and resource utilization would permit parallel resource use.

Figure 6:
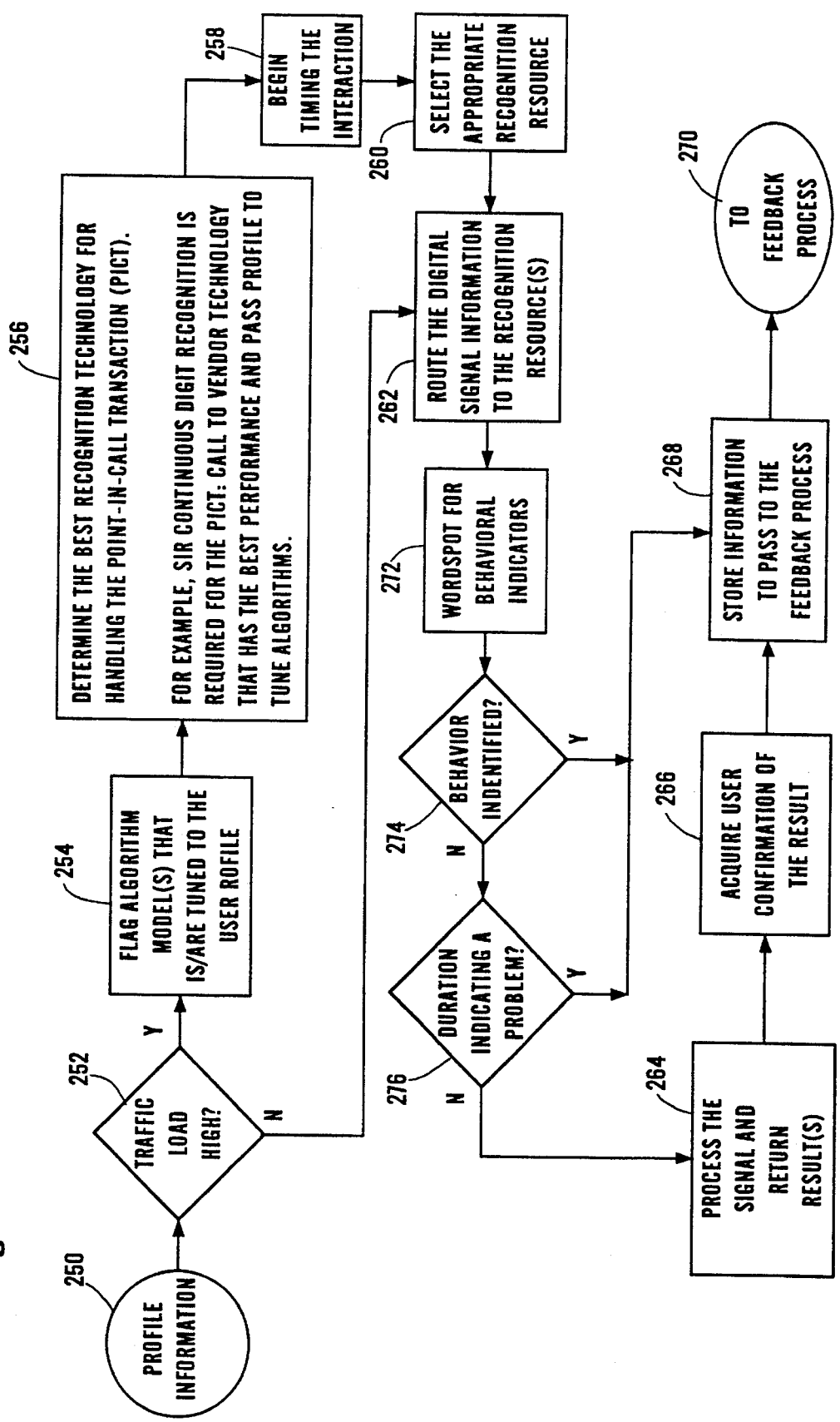
FIG. 6 is a flow diagram illustrating interaction in the process flow of the intelligent recognition system.

The interaction process is shown in flow diagram form in FIG. 6. Referring to that figure the profile information which results from the profiling process flow of FIG. 5 is indicated at 250. At 252 a determination is made as to whether the traffic load is too high and, if so, the appropriate initial resource or algorithm is selected at 254. At 256 further determination is made as to the best recognition technology for handling the point-in-call transaction (PICT), i.e., the specific intelligence being delivered at that time or point in the call. Thus if the PICT involves digit recognition the optimal resource for that process is selected. At 258 the processing using the initial resource commences and timing begins with actual selection occurring at 260 and the signal being routed to the selected resource at 262. Ignoring the behavioral steps for the time being, the signal from the resource is processed and the results provided at 264. The confirmation of the user may be obtained at 266 through the use of appropriate prompts, and information stored at 268 to pass to the feedback process at 270.

The behavioral determination aspect of the invention is indicated at 272, 274 and 276. Thus at 272 a suitable database is utilized to spot or recognize preselected words indicative of anxiety or other behavioral status. These may be words such as "damn", "dammit" or other indications of annoyance or agitation. On spotting such words in a suitable word recognition resource, a determination may be made at 274 as to whether a particular behavior can be identified. If this occurs at 274 a signal is passed into the feedback process at 268. This may result in a change in the series of prompts then used with the caller or may result in directing the call to an operator. If the behavior determination step at 274 is indeterminate and the process continues, a further determination point is reached at 276 as to whether the time of processing, which began at 258, has progressed to the point where a problem is indicated. If this occurs there is a signal to the feedback processes at 268 which triggers an appropriate reaction such as possible referral to a live operator.

From the foregoing it may be seen that the invention provides an architecture and method for using known individual devices and processes for implementing an approach to universal speech recognition with a high degree of reliability even including speaker authentication. Such an ability renders the methodology applicable to a wide range of applications not only in processing PSTN services but also to such diverse problems as effective home incarceration. This is effective utilizing a two-step passive and active procedure wherein the passive step is completely transparent to the user and the active step may be transparent to the user at least partially with respect to the activity. The architecture of the system includes an intelligent recognition platform containing multiple voice recognition resources having varying abilities so as to provide an instantaneous choice of the most appropriate resource for the type of recognition involved.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a switching system for connecting a calling station to a called station a method of establishing completion of said connection comprising the steps of:

responsive to said calling station dialing a destination identifier, establishing the identity of said calling station and using said identity to address a data base;

deriving from said data-base information relating to demographics of said calling station;

selecting from a plurality of speech recognition resources a first resource indicated by said demographic information;

establishing connection to said off-hook station;

inputting a spoken command from a caller at said calling station to said selected resource;

outputting from said first speech recognition resource a first output signal responsive to said spoken command;

selecting from said plurality of speech recognition resources a second resource responsive to said first output signal;

outputting from said second speech recognition resource a second output signal;

inputting a second spoken command from said caller at said calling station to said second resource;

outputting from said second speech recognition resource a third output signal responsive to the second spoken command;

determining the degree of traffic through said plurality of speech recognition resources;

comparing the determined degree of traffic to a predetermined traffic load; and responsive to said determined degree of traffic being below said predetermined load, inputting at least one of said spoken commands to a plurality of said resources in parallel.

2. A method according to claim 1 including the steps of:

responsive to said second output signal selecting an audio request from a plurality of preestablished audio requests and outputting to said caller said selected audio request requesting said second command;

said caller inputting said second spoken command responsive to said selected audio request.

3. A method according to claim 2 including the steps of:

outputting multiple audio commands to said caller;

commencing timing of interaction with said caller subsequent to commencement of a spoken caller command;

comparing the duration of the interaction with said caller from said commencement of timing to a predetermined time duration;

connecting said caller to an operator station upon the timed duration of said timing exceeding said predetermined time duration.

4. A method according to claim 1 including the step of outputting from said plurality of speech recognition resources in parallel a fourth output signal.

5. A method according to claim 1 wherein said database is accessed responsive to common channel signaling in said switching system.

6. A method according to claim 5 wherein said common channel signaling accesses said database via a Signal Control Point (SCP) in said switching system.

7. A method according to claim 5 wherein said switching system is a Public Switched Telephone Network (SPTN).

8. A method according to claim 7 wherein the identity of said calling station is established responsive to a signal generated in said PSTN pursuant to the conventional operation of said PSTN.

9. A method according to claim 1 including the steps of:

sensing from said calling station characteristics of said caller through means other than audio sensing means and generating a signal representative of said characteristics;

inputting said signal representative of said characteristics to at least one of the resources in said plurality of resources; and outputting a signal from said at least one resource substantially simultaneously with outputting of a signal from at least one other resource which is responsive to a spoken command from said caller.

10. A method according to claim 9 wherein said sensing means other than an audio sensing means is an optical sensing means.

11. A method according to claim 1 including the steps of:

monitoring command signals from said caller to detect the utterance of at least one of a plurality of predetermined utterances; and outputting a control signal responsive to the detection of the utterance of at least one of said plurality of predetermined utterances.

12. A method according to claim 11 including the step of:

outputting an audio prompt to said caller responsive to said control signal.

13. A method according to claim 1 including the steps of:

sensing from said calling station characteristics of said caller through means other than audio sensing means and generating a signal representative of said characteristics; and utilizing said signal representative of said characteristics to at least partially control said output from said plurality of resources responsive to said spoken command.

14. A method according to claim 13 including the step of:

utilizing said signal representative of said characteristics to at least partially control the selection of at least one resource in said plurality of resources.

15. A method according to claim 1 including the steps of:

optically sensing from said calling station lip movement of said caller;

generating a signal representative of the words indicated by said lip movement; and utilizing said signal representative of the words indicated by said lip movement to at least partially control the output signal responsive to said spoken command.

16. In a Publicly Switched Telephone Network (PSTN) which includes Common Channel Signaling (CCS) and a Signal Control Point (SCP), a method of completing a call from a calling station to a called station comprising the steps of:

responsive to said calling station dialing a destination identifier, establishing the identity of said calling station through said CCS pursuant to the conventional functioning of said PSTN;

using said identity of said calling station to address a data base associated with said SCP;

deriving from said data base information relating to demographics of said calling station;

selecting from a plurality of resources a resource indicated by said demographic information;

establishing a connection to said off-hook station;

inputting a spoken command from a caller at said calling station to said selected resource;

sensing from said calling station characteristics of said caller through means other than audio sensing means and generating a signal representative thereof;

outputting to said caller an audio signal selected from a plurality of preestablished audio signals based on at least one of (a) audio sensing of said spoken command and (b) sensing other than audio;

inputting a second spoken command from said caller responsive to said audio signal outputted to said caller;

outputting from said plurality of resources a second output signal responsive to said second spoken command;

determining the degree of traffic through said plurality of resources;

comparing the determined degree of traffic to a predetermined traffic load; and responsive to said determined degree of traffic being below said predetermined load, inputting at least one of said spoken commands to a plurality of said resources in parallel.

17. A method according to claim 16 including the steps of:

sensing said characteristics through said means other than audio means on a continuing basis including lip reading; and generating from said lip reading an output signal responsive to said spoken commands.

18. A switching system including interconnected switching offices and stations connected to at least certain of said switching offices and a Common Channel Signaling System (CCSS) for controlling the connection of a calling station to a called station through said switching system;

a plurality of speech recognition resources connected to said switching system;

a data base associated with said CCSS having stored therein demographic information related to said stations connected to said switching stations;

means for addressing said data base in response to said calling station dialing a destination identifier to access demographic information relating to said dialing station;

means responsive to said accessed information to select at least one of said resources and to connect a signal from said calling station to said selected resource;

means associated with said plurality of resources for outputting a signal responsive to a spoken command to said calling station; and audio response means for generating a plurality of predetermined audio responses, said audio response means generating an audio response responsive to said signal responsive to said spoken command;

said audio response inviting a further spoken command from said calling station, and including means associated with said plurality of resources for outputting a signal responsive to outputs from at least a pair of said resources operating in parallel.

19. A switching system according to claim 18 including:

sensing means associated with said calling station for sensing a characteristic other than an audible characteristic, said sensing means generating an output signal responsive to the characteristic sensed; and means for rendering the signal outputted by said plurality of resources at least partially responsive to said output signal responsive to the characteristic sensed.

20. A switching system according to claim 19 wherein said sensing means is optical and the sensed characteristic is lip movement.

21. A switching system according to claim 18 including:

an operator station;

timing means;

means for initiating timing by said timing means at a predetermined occurrence after said calling station goes off-hook;

means establishing a predetermined time duration for timing by said timing means; and means responsive to said timing means reaching said predetermined time duration to cause connection of said calling station to said operator station.

\* \* \* \* \*